United States Patent [19]
Ishizuki et al.

[11] Patent Number: 5,079,966
[45] Date of Patent: Jan. 14, 1992

[54] GEAR SELECTOR MECHANISM FOR AUTOMATIC TRANSMISSION

[75] Inventors: Masaharu Ishizuki, Zama City; Norio Togano, Shizuoka Prefecture, both of Japan

[73] Assignees: Nissan Motor Co., Ltd.; Fuji Kiko Co., Ltd., both of Japan

[21] Appl. No.: 514,454

[22] Filed: Apr. 25, 1990

[30] Foreign Application Priority Data

May 8, 1989 [JP] Japan .................... 1-115439

[51] Int. Cl.$^5$ .................... B60K 20/00; G05G 5/06
[52] U.S. Cl. .................... 74/473 R; 74/475; 74/538
[58] Field of Search .................... 74/473 R, 475, 538

[56] References Cited

U.S. PATENT DOCUMENTS 4,365,522 12/1982 Kubota et al. .................... 74/475

4,473,141 9/1984 Mochida .................... 74/475 X

FOREIGN PATENT DOCUMENTS 57-50730 9/1976 Japan .
1182766 12/1968 United Kingdom .

Primary Examiner—Allan D. Herrmann
Assistant Examiner—David W. Laub
Attorney, Agent, or Firm—Lowe, Price, Leblanc & Becker

[57] ABSTRACT

In a gear selector mechanism for an automatic transmission, a pivotal support of a T-like configuration is provided which consists of a crosswise sleeve and a longitudinal tube. The crosswise sleeve is rotatably installed on a pivot which is installed in a floor panel by way of a base plate. A gear shift lever is installed on the longitudinal tube of the pivotal support for tuning together with same.

8 Claims, 3 Drawing Sheets

GEAR SELECTOR MECHANISM FOR AUTOMATIC TRANSMISSION

BACKGROUND OF THE INVENTION

1. Field of the Invention

The present invention relates in general to automatic transmission control and more particularly to a gear selector mechanism for an automatic transmission.

2. Description of the Prior Art

An example of a prior art gear selector mechanism is disclosed in Japanese Utility Model Provisional Publication No. 57-50730.

In the prior art gear selector mechanism, a gear shift lever is installed directly on a pivot which is in turn supported on a vehicle body by way of a base plate. Due to this, the path of movement of the knob, the inclination of the shift lever and the place at which the shift knob passes through the console box are determined depending upon the position of the pivot shaft relative to the vehicle body. The position of the pivot is determined depending upon the vehicle underbody structure, the press formability (i.e., formability by press working) of the constituent parts of the gear selector mechanism and the underbody, etc. Further, the place through which the gear shift lever passes through the console box is determined depending upon the structure, size, etc. of the console box.

For the above reason, there has been a difficulty in attaining the layout which is desirable for both the gear selector mechanism and the console box.

SUMMARY OF THE INVENTION

In accordance with the present invention, there is provided an improved gear selector mechanism for an automatic transmission.

The gear selector mechanism comprises a pivotal support pivotally supported at an end portion on a vehicle body in such a manner as to have the other end portion movable upwardly and downwardly relative to the vehicle body and a gear shift lever installed at a lower end thereof on the other end portion of the pivotal support for turn together with same.

The above structure is effective for solving the above noted problem inherent in the prior art device.

It is accordingly an object of the present invention to provide an improved gear selector mechanism for an automatic transmission which can increase the design and layout freedom.

It is a further object of the present invention to provide an improved gear selector mechanism of the above described character which can attain a desired layout of a shift lever without adversely affecting an adjacent parts such as a console box, etc.

DESCRIPTION OF THE PREFERRED EMBODIMENT

Figure 1:
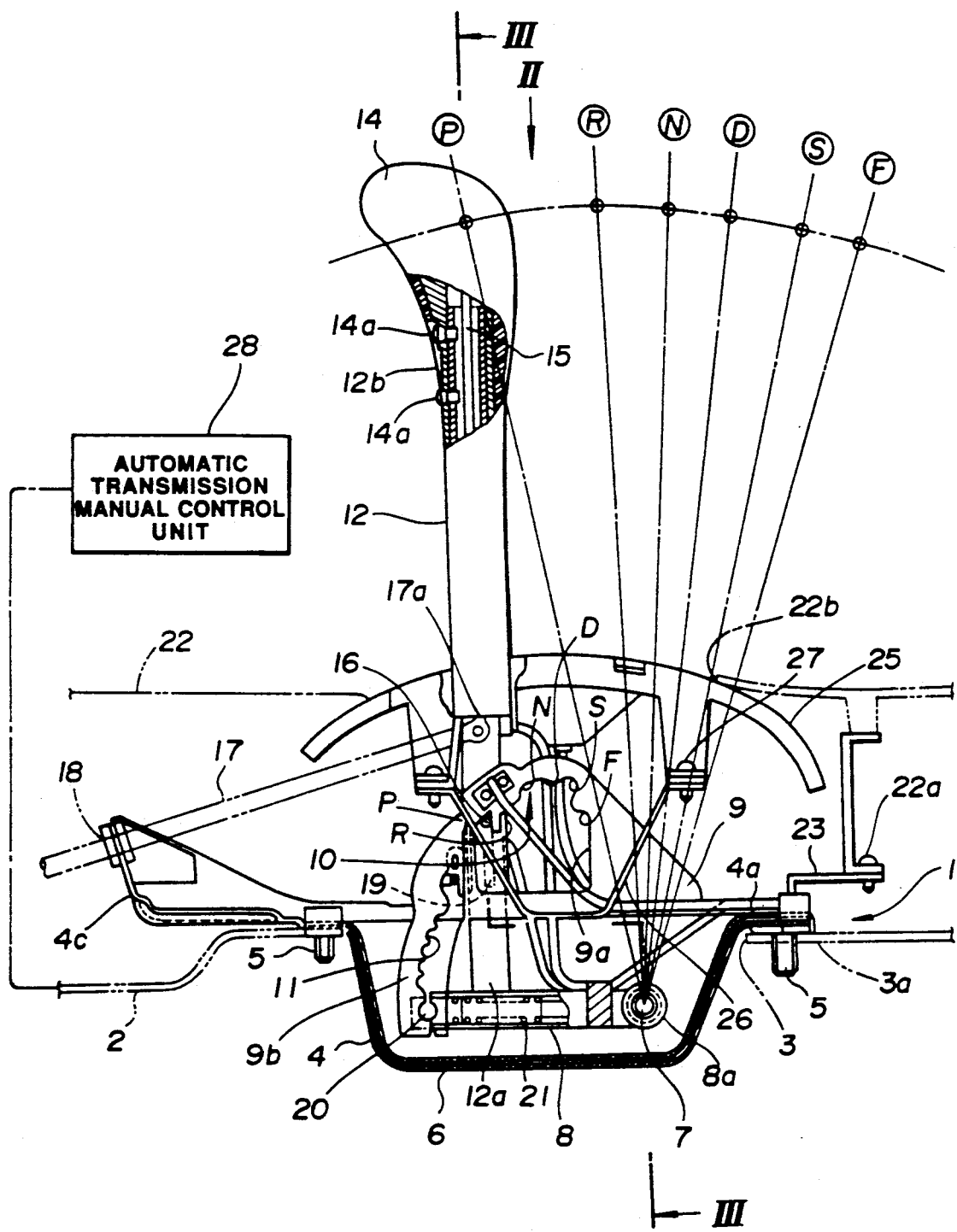
FIG. 1 is a side elevational, partly cutaway view of a gear selector mechanism for an automatic transmission according to an embodiment of the present invention.
Figure 2:
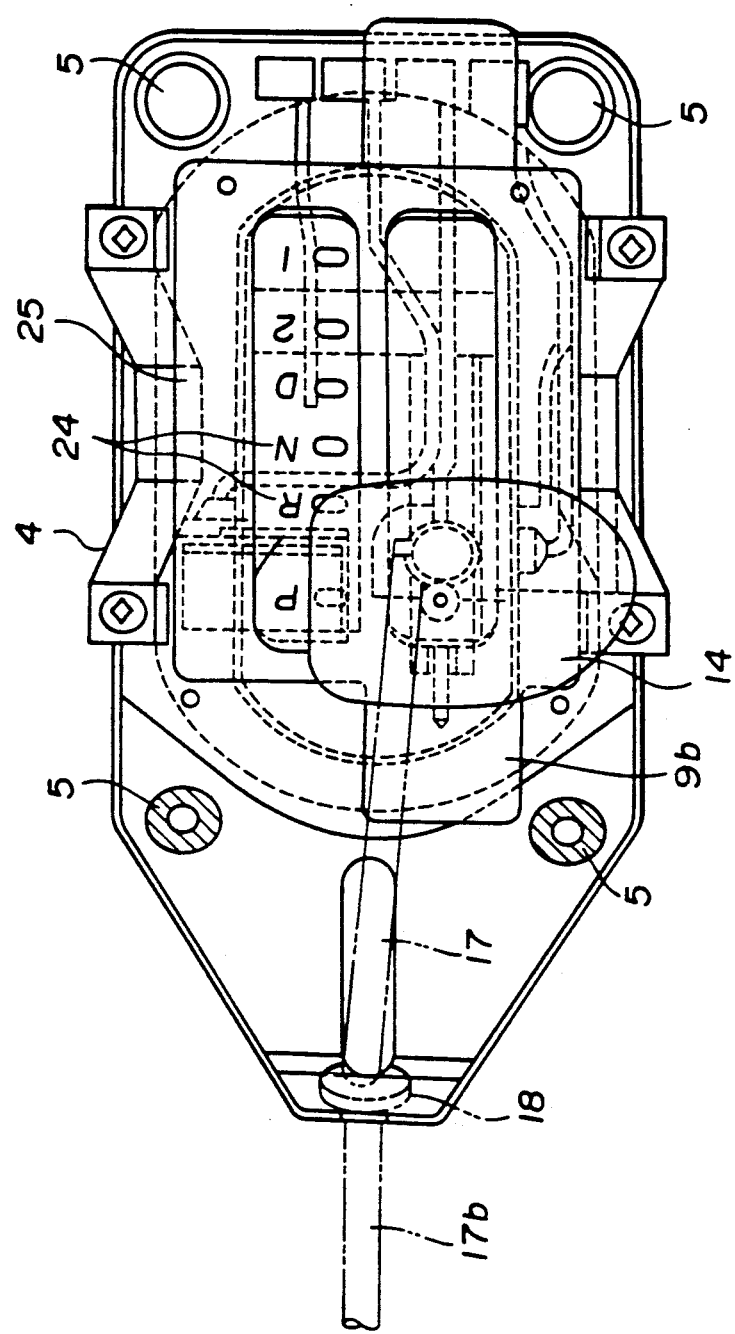
FIG. 2 is a top plan view (i.e., a view taken in the direction of the arrow II in FIG. 1) of the gear selector mechanism of FIG. 1.
Figure 3:
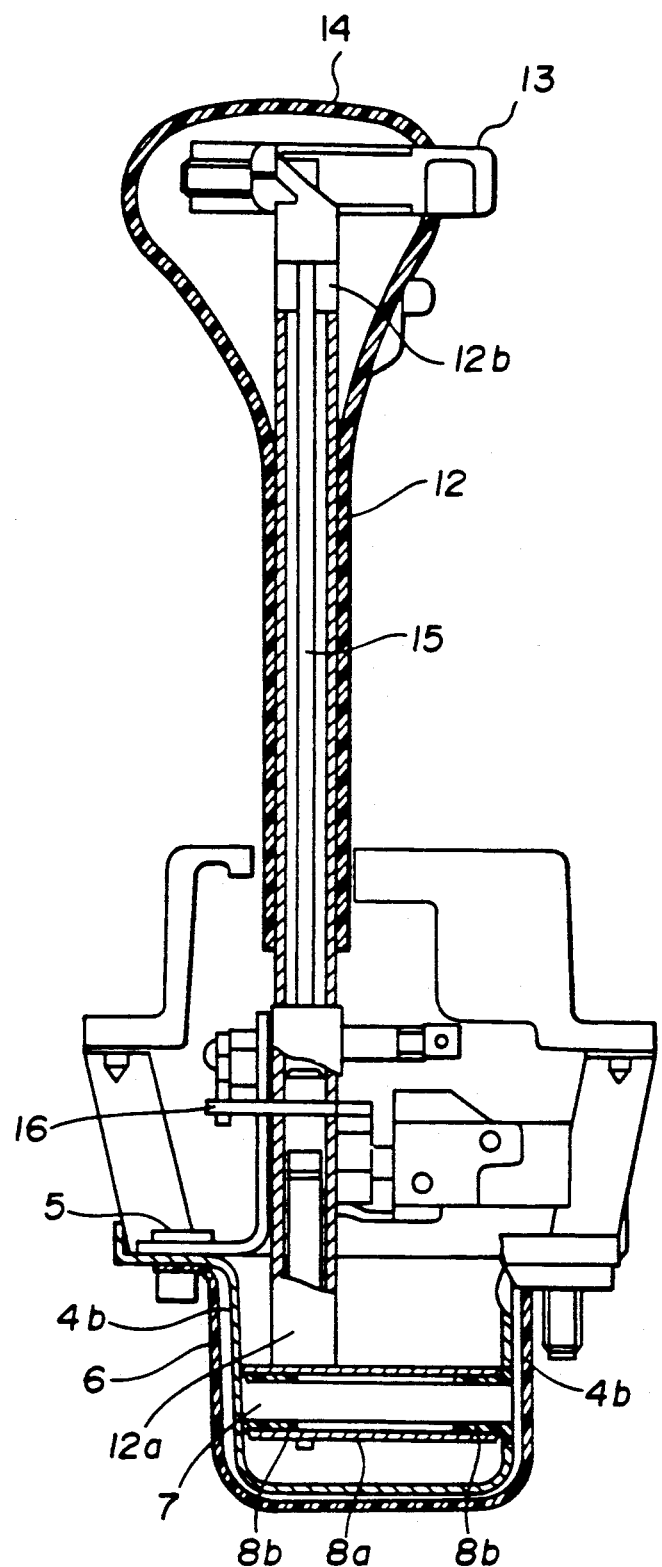
FIG. 3 is a sectional view taken along the line III—III in FIG. 12.

Referring to FIGS. 1 to 3, a vehicle body is generally indicated by the reference numeral 1 and includes a floor panel 2 formed with a through hole 3 and a vessel-like (i.e., a rectangular container-like shape in this embodiment) base plate 4 disposed so as to have a rectangular portion protruding downwardly through the hole 3. The floor panel 2 has a flat, horizontal panel portion 3a surrounding the hole 3. The base plate 4 has at an upper end thereof a peripheral flange 4a placed on the panel portion 3a of the floor panel 2 and secured to same with a fastening device 5 as bolts and nuts. A dust cover 6 made of a synthetic resinous material is disposed so as to cover the outboard side of the base plate 4 and secured with the fastening device 5 to the floor panel 2 together with the base plate 4. The base plate 4 has a pair of upstanding side walls 4b opposed laterally of the vehicle body 1, i.e., opposed in the vehicle width direction. A pivot 7 extends between the side walls 4b and supported on same. A pivotal support 8 of a T-like configuration has a crosswise sleeve 8a rotatably installed on the pivot 7 and a longitudinal tube 8c. Bearing collars 8b are disposed between the the pivot 7 and the crosswise sleeve 8a of the pivotal support 8.

A position plate 9 is supported on the peripheral flange 4a of the base plate 5 and fastened to same together with the panel portion 3a of the floor panel 2 by means of the fastening device 5. The position plate 9 has an opening 9a the upper edge of which has an inverted U-like shape and is formed with a plurality of cuts 10 defining a parking position "P", a reverse position "R", neutral position "N", a drive position "D", a second gear position "S" and a first gear positioin "F", respectively. The position plate 9 further has a front end portion 9b projecting forwardly and downwardly from the portion formed with the above mentioned cuts 10. The front end portion 9b is provided at the inner or inboard edge thereof with a stepwise support 11 consisting of a plurality of alternate projections and depressions.

A hollow cylindrical gear shift lever 12 is welded or otherwise secured at the lower end 12a thereof to the longitudinal tube 8c of the pivotal support 8 to turn or swing as an integral unit. A push button 13 is retractably installed in a knob 14 which is in turn secured to an upper end portion 12b of the shift lever 12 with screws 14a. A position pin 16 is installed in the shift lever 12 in such a manner as to be engageable with the cuts 10 to be lockingly held there at and be releasable from same when the compression rod 15 is pushed down by the push button 13. A control cable 17 is pivotally supported at an end 17a on the gear shift lever 12 and operatively connected at the other end to an automatic transmission manual control unit 28. The control cable 17 extends through a grommet 18 which is fitted on an upstanding flange portion 4c of the base plate 4. The shift lever 12 is formed with an axially elongated opening 19 in which the position pin 16 is disposed for upward and downward movement under the control of the push button 13.

A steel ball 20 is installed on the other end portion 8b of the pivotal support 8 and always urged against the stepwise support 11 of the position plate under the bias of a spring 21 which is installed in the longitudinal tube 8c of the pivotal support 8 such that the steel ball 20 is releasably engaged with the stepwise support 11 for thereby setpwisely supporting the pivotal support 8 relative to the position plate 9.

A console box 22 is installed on an elevated bracket portion 23 of the base plate 4 by means of screws 22a. The console box 22 is formed with an opening 22b in which is disposed an indicator 25 having position marks as P, R, N, D, S and F. The indicator 25 is secured with screws 27 to an upstanding bracket portion 26 of the base plate 4 to be supported thereon.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

From the foregoing, it will be understood that according to the present invention it becomes possible to variably set with a less restriction or an increased freedom the parking position "P", neutral position "N", drive position "D", etc, of the shift lever 12 and the position of the knob 14 through variations of the place at which the shift lever 12 is installed on the longitudinal tube 8c of the pivotal support 8 and through vairations of the layout of the cuts 10.

It will be further understood that according to the present invention it becomes possible to attain a desired layout of the knob 14 with ease without adversely affecting the layout and design of the console box 22, the floor panel 2, the cuts 10, etc.

It will be further understood that the shift lever 12 is shown in FIG. 1 as being held in the parking position "P" and is movable in sequence into the gear positions "R", "N", "D", "S" and "F" when rotated about the pivot 7. In this instance, movement of the shift lever 12 from one gear position to the next gear position causes the steel ball 20 to once retract into the longitudinal tube 8c of the pivotal support 8 under the push of a projection of the stepwise support 11 and then projects therefrom to engage in a depression of the stepwise support 11 under the bias of the spring 21, thus making it possible for the shift lever 12 to effect stepwise movement or turn. In other words, engagement of the position pin 16 in the cuts 10 is coincident with engagement of the steel ball 20 in the depressions of the pivotal support 11, respectively.

What is claimed is:

1. A gear selector mechanism for an automatic transmission, comprising:
    a support element pivotally supported at a first end portion on a vehicle body in such a manner as to have a second end portion movable upwardly and downwardly as the support element is pivoted relative to the vehicle body; and
    a gear shift lever connected at a lower end to said second end portion of said support element for turning therewith, whereby said lower end of said gear shift lever is maintained at a distance from an axis about which said support element pivots.

2. A gear selector mechanism for an automatic transmission, comprising:
    a horizontal pivotal support pivotally supported at an end portion on a vehicle body in such a manner as to have the other end portion movable upwardly and downwardly relative to the vehicle body;
    a vertical gear shift lever installed at a lower end on said other end portion of said pivotal support for turning therewith and having an upper end knob;
    a position plate installed on the vehicle body and apertured to have a plurality of cuts defining gear positions including a parking position, a neutral position and drive position for said gear shift lever;
    a position pin movably installed on said gear shift lever and releasably engageable with said cuts of said position plate for limitedly controlling turning of said gear shift lever;
    a push button installed on said knob and operatively connected to said position pin for controlling movement thereof;
    a stepwise support provided to said position plate and releasably engageable with said other end portion of said pivotal support for holding said gear shift lever in positions varying stepwisely; and
    a control cable having an end connected to said shift lever and the other end connected to an automatic transmission manual control unit.

3. A gear selector mechanism as claimed in claim 2, wherein:
    wherein said position plate has an end portion extending from a portion formed with said cuts forwardly and downwardly of the vehicle body, said stepwise support comprising a plurality of projections and depressions formed in an inner edge of said end portion.

4. A gear selector mechanism for an automatic transmission, comprising:
    a pivotal support pivotally supported at an end portion on a vehicle body in such a manner as to have the other end portion movable upwardly and downwardly relative to the vehicle body;
    a gear shift lever installed at a lower end thereof on said other end portion of said pivotal support for turn together with same; and
    a pivot installed on a vehicle body in such a manner as to extend crosswise of the vehicle body, said pivotal support being of a T-like configuration and having a crosswise sleeve rotatably installed on said pivotal and a longitudinal tube extending longitudinally of the vehicle body, said gear shift lever being secured at a lower end thereof to said longitudinal tube of said pivotal support.

5. A gear selector mechanism as claimed in claim 4, further comprising:
    a base plate secured to a floor panel of the vehicle body and having a container-like portion projecting downwardly from the floor panel, said container-like portion of said base plate having a pair of side walls opposed crosswise of the vehicle body, said pivot extending between said side walls of said base plate and supported on same.

6. A gear selector mechanism as claimed in claim 5 wherein:
    a steel ball is installed on an end portion of said longitudinal tube of said pivotal support and is yieldingly urged against said stepwise support.

7. A gear selector mechanism as claimed in claim 6 wherein:
    a spring is installed in said longitudinal tube of said pivotal support for urging said steel ball against said stepwise support.

8. A gear selector mechanism as claimed in claim 7 wherein:
    engagement of said steel ball in said depressions of said pivotal support is conicident with engagement of said position pin in said cuts, respectively.

* * * * *